June 29, 1965 W. SHEA Re. 25,813

DISPLAY BALL-POINT PEN

Original Filed Jan. 4, 1960

INVENTOR.
WARREN SHEA
BY Harry Ernest Rubens
ATTORNEY

United States Patent Office

Re. 25,813
Reissued June 29, 1965

25,813

DISPLAY BALL-POINT PEN

Warren Shea, Jersey City, N.J., assignor to Radiant Pen Corp., Kenilworth, N.J.

Original No. 3,077,692, dated Feb. 19, 1963, Ser. No. 166,554, Jan. 16, 1962, which is a division of Ser. No. 147, Jan. 4, 1960. Application for reissue Oct. 13, 1964, Ser. No. 418,363
2 Claims. (Cl. 40—334)

Matter enclosed in heavy brackets [ ] appears in the original patent but forms no part of this reissue specification; matter printed in italics indicates the additions made by reissue.

My invention relates to a ball-point pen provided with a transparent outer barrel and a protected inner sleeve containing printed or colored material.

Such a pens are desirable for displaying advertising or ornamentation which may be inserted under the barrel of the pen where it will be permanently protected. Printing on the outside of the pen is subject to constant wear which eventually causes illegibility of the printing.

Hitherto the outer member was split to allow insertion of the display material between two shoulders forming a pocket on the inner member. This permitted dust to enter the pocket. The various methods of assembly employed were cumbersome and expensive. Where the display material was simply inserted under the barrel, it was free to move and sometimes was lost to view.

When a pocket is formed by grooving, the manufacturing costs are high. Moreover, a grooved part is difficult to mold.

Accordingly, an important object of the invention is to provide a ball-point pen which readily lends itself to mass production when made of plastic material.

Another important object is to provide an inner sleeve supporting the display material in a ball-point pen which sleeve is secured by a spring and is not free to move within the pen barrel.

One more object is to provide a pen with a transparent outer barrel and a removable colored inner sleeve both of which are tapered to provide a streamlined construction.

Other objects are to provide a barrel and inner sleeve which can be easily assembled; which does not require rotation or threading of the parts; which can extend one with the other for the entire length of the barrel; which may be formed without external seams; and which will prevent the cartridge and spring from being seen through the transparent barrel.

Figure 1:
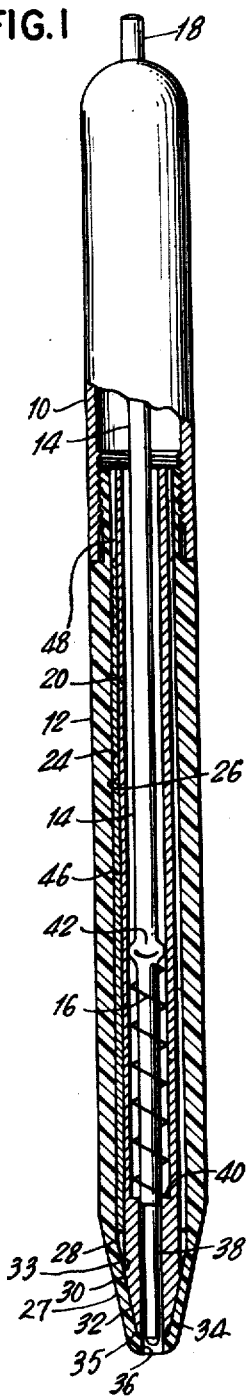
Figure 2:
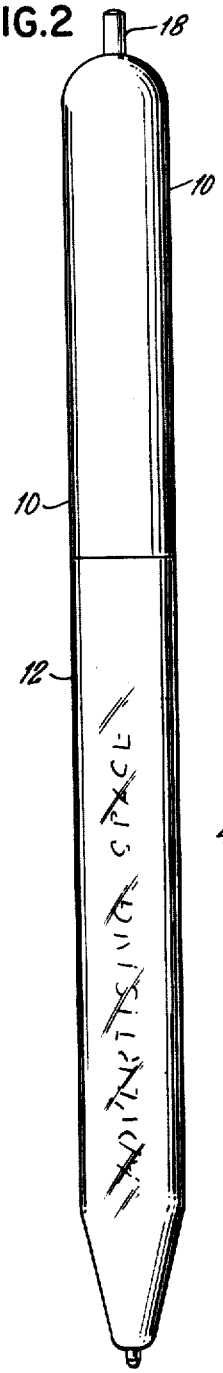
Figure 3:
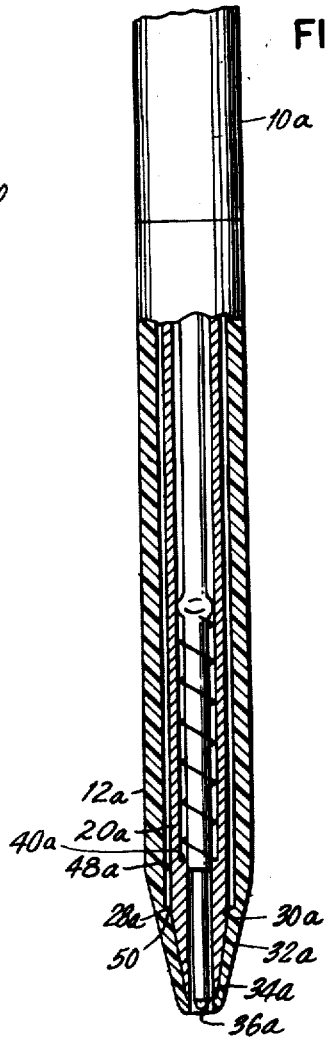

I accomplished these and other objects and obtain my new results as will be apparent from the pen described in the following specification, particularly pointed out in the claims, and illustrated in the accompanying drawing in which:

FIG. 1 is a longitudinal, partly sectioned view of a ball-pointed pen illustrating the invention, FIG. 2 is an outside view of the same, and FIG. 3 is a longitudinal fragmentary view of a modification.

The invention comprises a transparent outer barrel provided with a shoulder on the inner surface of the same, and an inner sleeve provided with means for maintaining the sleeve in position against the barrel shoulder. The parts are assembled by first inserting the sleeve with the display material entirely inside the barrel.

More specifically the pen illustrated comprises an internally threaded cap 10, an externally threaded barrel 12, a ball-pointed cartridge 14, and a spring 16, cooperating with a push button mechanism 18 for protracting and retracting the cartridge. While a pen is illustrated, the invention can be attached to or form a part of any device having a tubular construction.

Within the barrel 12, I have provided an inner sleeve member 20 upon which the display material is supported.

The inner surface 24 of the barrel, and the surface 26 of the sleeve are substantially cylindrical throughout their length, except for the inwardly formed taper at the ends thereof, which starts at point 28 of the barrel and point 30 of the sleeve to form tapered surfaces 32 and 33. The tapered surfaces permit streamlining the lower barrel, as at 27. A shoulder 34 on the barrel is formed to act as a stop for end 35 of the sleeve, thus positioning the two parts one inside the other. The opening 36 for the point of the cartridge in the barrel, is an extension of opening 38 of the inner sleeve, which is additionally provided on the inside with a shouldered portion 40 for seating the spring 16. The spring 16 is compressed between shoulder 40, and a projection 42 of the cartridge, to permit retraction in a known manner, when the push button mechanism is released. The spring also maintains the inner sleeve securely in position within the barrel and prevents dislocation of the display material or exposure of the cartridge and spring during movement thereof.

At the other end of the pen, I prefer to have the inner sleeve 20, form a loose fit along the inner surface 24 of the barrel.

A sheet 46 may be wrapped around the surface 26 of the inner sleeve, which is thereafter inserted into the barrel. The sheet may be decorated and printed in any desired fashion, and will be visible through the barrel 12 which should be made of transparent material. The decoration or printing may be directly applied to surface 26 of the sleeve which is usually made with a contrasting opaque color and is easily replaceable.

As is apparent from the drawing, both the barrel and the inner sleeve may each be made in a simple mold, and thus easily mass produced.

The inside wall of the barrel between points 28 and 30, instead of being an extension of the tapered surface 32, may be formed as a right angle shoulder 50, see FIG. 3, where the parts are similarly numbered with an "a" added.

The constructions thus described have the following advantages.

(1) The parts may be easily molded.
(2) The parts are easily fitted together.
(3) The sleeve containing the display material is on the entire inside of the barrel where it is protected.
(4) The construction is extremely sturdy.
(5) The colored sleeve may be easily changed if desired.
(6) No split sleeves are employed which would allow dust to enter.
(7) A minimum number of parts are employed.
(8) No seams are externally required to form the inner pocket.
(9) The spring locks the sleeve in position so that it cannot move, in use.
(10) The colored inner sleeve extends for the entire length of the barrel.
(11) A standard cartridge is employed.

This a division of my application Serial Number 147 filed January 4, 1960.

I have thus described my invention, but I desire it understood that it is not confined to the particular forms or uses shown and described, the same being merely illustrative, and that the invention may be carried out in other ways without departing from the spirit of my invention, and therefore I claim broadly the right to employ all equivalent instrumentalities coming within the scope of the appended [claim,] *claims*, and by means of which objects of my invention are obtained and new results accomplished as it is obvious that the particular embodiments herein shown and described are only some of the many that can be employed to obtain these objects and accomplish these results.

I claim:

*1.* A writing instrument comprising a ball-point cartridge, a barrel entirely made of transparent material having a mouth for inserting the cartridge, and an opening through which the cartridge projects; a cap engaging and covering the mouth of the barrel having a protract and retract mechanism therein, said barrel having an inner wall extending from the mouth to the region adjacent the opening and terminating in a stop surface; a tubular sleeve for supporting display material positioned within said barrel and engaging the stop surface of the barrel to accurately position the sleeve within said barrel, said sleeve provided with a seat on the inner wall thereof, and a spring engaging the seat for securing said sleeve at the stop surface to prevent dislocation of the sleeve within the barrel and for retracting the cartridge, said cartridge extending through the barrel and sleeve.

*2. A writing instrument comprising a ball-point cartridge, a barrel entirely made of transparent material having a mouth for inserting the cartridge, and an opening through which the cartridge projects; a cap engaging and covering the mouth of the barrel having a protract and retract mechanism therein, said barrel having an inner*

*wall extending from the mouth to the region adjacent the opening and a stop surface; a tubular sleeve for supporting display material positioned within said barrel and engaging the stop surface of the barrel to accurately position the sleeve within said barrel, said sleeve provided with a seat on the inner wall thereof, and a spring engaging the seat for securing said sleeve at the stop surface to prevent dislocation of the sleeve within the barrel and for retracting the cartridge, said cartridge extending through the barrel and sleeve.*

References Cited by the Examiner

The following references, cited by the Examiner, are of record in the patented file of this patent or the original patent.

UNITED STATES PATENTS

| | | | |
|---|---|---|---|
| 2,347,144 | 4/44 | Wilson | 40—334 |
| 2,725,038 | 11/55 | Morris | 120—42.03 |

FOREIGN PATENTS

| | | |
|---|---|---|
| 695,363 | 8/53 | Great Britain. |
| 1,095,468 | 12/54 | France. |
| 1,204,214 | 8/59 | France. |

EUGENE R. CAPOZIO, *Primary Examiner.*